US008594696B2

(12) United States Patent
    Siomina

(10) Patent No.: US 8,594,696 B2
(45) Date of Patent: Nov. 26, 2013

(54) POSITIONING NODE, USER EQUIPMENT AND METHODS THEREIN

(75) Inventor: Iana Siomina, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 13/256,759

(22) PCT Filed: Jul. 8, 2011

(86) PCT No.: PCT/SE2011/050930
    § 371 (c)(1),
    (2), (4) Date: Dec. 12, 2011

(87) PCT Pub. No.: WO2012/023896
    PCT Pub. Date: Feb. 23, 2012

(65) Prior Publication Data
    US 2012/0083288 A1      Apr. 5, 2012

Related U.S. Application Data

(60) Provisional application No. 61/374,037, filed on Aug. 16, 2010, provisional application No. 61/445,361, filed on Feb. 22, 2011.

(51) Int. Cl.
    *H04W 24/00*   (2009.01)
(52) U.S. Cl.
    USPC ...................................................... 455/456.1
(58) Field of Classification Search
    USPC .............. 455/456.2, 456, 73, 456.3, 456.1, 455/456.5, 450, 434, 456.4, 422.1, 501, 455/466, 404.2; 370/508, 252, 329, 338, 370/254; 342/357.42, 357.25, 357.43, 342/357.44
    See application file for complete search history.

(56) References Cited

U.S. PATENT DOCUMENTS

| | | | |
|---|---|---|---|
| 2003/0087647 A1* | 5/2003 | Hurst | 455/456 |
| 2004/0166856 A1 | 8/2004 | Niemenmaa | |
| 2005/0007980 A1 | 1/2005 | Landais et al. | |
| 2005/0053099 A1* | 3/2005 | Spear et al. | 370/508 |

(Continued)

FOREIGN PATENT DOCUMENTS

| | | |
|---|---|---|
| WO | 00/78084 | 12/2000 |
| WO | 2008/085952 A1 | 7/2008 |
| WO | 2009/038359 A2 | 3/2009 |

OTHER PUBLICATIONS

3GPP TS 36.211 V9.1.0, 3rd Generation Partnership Project; Technical Specification Group Radio Access Network; Evolved Universal Terrestrial Radio Access (E-UTRA); Physical Channels and Modulation (Release 8) (Mar. 2010).

(Continued)

*Primary Examiner* — Kiet Doan
(74) *Attorney, Agent, or Firm* — Nixon & Vanderhye, P.C.

(57) ABSTRACT

Embodiments herein relate to a method in a positioning node for enabling positioning of a user equipment, which user equipment is served in a first cell controlled by a radio network node. The positioning node and radio network node are comprised in a radio communications network. The positioning node obtains an indication indicating availability, at the user equipment, of timing information of at least one cell. The positioning node further determines whether the timing information of the at least one cell is available at the user equipment based on the obtained indication, which timing information is enabling positioning of the user equipment.

34 Claims, 6 Drawing Sheets

(56) References Cited

U.S. PATENT DOCUMENTS

| | | | |
|---|---|---|---|
| 2009/0069032 A1* | 3/2009 | Rowland et al. | 455/456.2 |
| 2010/0120394 A1* | 5/2010 | Mia et al. | 455/404.2 |
| 2010/0214939 A1* | 8/2010 | Ryan | 370/252 |
| 2010/0227569 A1* | 9/2010 | Bala et al. | 455/73 |
| 2012/0149430 A1 | 6/2012 | Siomina et al. | |
| 2013/0059610 A1 | 3/2013 | Siomina et al. | |

OTHER PUBLICATIONS

3GPP TS 36.355 V9.2.1, 3rd Generation Partnership Project; Technical Specification Group Radio Access Network; Evolved Universal Terrestrial Radio Access (E-UTRA); LTE Positioning Protocol (LPP) (Release 9) (Jun. 2010).

3GPP TS 36.133 V8.1.0, 3rd Generation Partnership Project; Technical Specification Group Radio Access Network; Evolved Universal Terrestrial Radio Access (E-UTRA); Requirements for Support of Radio Resource Management (Release 9) (Mar. 2008).

International Search Report and Written Opinion mailed Dec. 27, 2011 in PCT Application No. PCT/SE2011/050930.

ETSI TS 136 305 V9.3.0; LTE; Evolved Universal Terrestrial Radio Access Network (E-UTRAN); Stage 2 function specification of User Equipment (UE) positioning in E-UTRAN (3GPP TS 36.305 version 9.3.0 Release 9) (Jul. 2010).

ETSI TS 136 355 V9.2.1; LTE; Evolved Universal Terrestrial Radio Access (E-UTRA); LTE Positioning Protocol (LPP) (3GPP TS 36.355 version 9.2.1. Release 9) (Jul. 2010).

U.S. Appl. No. 61/333,007, filed May 10, 2010, Siomina et al, "Methods for GAP Configuration for GAP-Assisted Position Measurements", filed as U.S. Appl. No. 13/697,252 and published as U.S. Publication 2013/0059610.

U.S. Appl. No. 61/374,037, filed Aug. 16, 2010, Siomina et al, "Methods and Procedures for Ensuring Reliable Position During Handover".

Nokia Siemens Networks, et al., "Measurement Gap Creation." R4-070927. 3GPP TSG-RAN WG4 Meeting #43bis. Orlando, FL, Jun. 25-29, 2007. 3rd Generation Partnership Project, Sophia-Antipolis, France.

Sharp, "Measurement Gap Control for E-UTRAN." R2-062928. 3GPP TSG-RAN WG2#55, Seoul, Korea, Oct. 9-13, 2006. 3rd Generation Partnership Project, Sophia-Antipolis, France.

Nokia, "Mobility requirements and inter-frequency RSTD measurements." R4-101388. 3GPP TSG-RAN WG4 Ad hoc meeting #1 0-02. Dublin, Ireland, Mar. 12-16, 2010. 3rd Generation Partnership Project, Sophia-Antipolis, France.

Motorola, "Measurement Gap Control for E-UTRAN to GERAN Handover." GR-070006. 3GPP RAN-GERAN Workshop on GERAN/LTE. Sophia-Antipolis, France, Sep. 27-28, 2007.

Huawei, "Considerations on Gap Length Design for Gap-assisted E-UTRA Measurements." R4-070958. 3GPP TSG-RAN WG4 Working Group 4 (Radio) meeting #43bis. Orlando, FL, Jun. 25-29, 2007. 3rd Generation Partnership Project, Sophia-Antipolis, France.

Ericsson et al., "Measurement gap configuration for inter-freq RSTD measurement." R2-106464. 3GPP TSG-RAN WG2 #72. Jacksonville, FL, Nov. 15-19, 2010. 3rd Generation Partnership Project, Sophia-Antipolis, France.

International Search Report and Written Opinion mailed Nov. 22, 2011 in PCT Application No. PCT/SE2011/050990.

Ericsson, Inter NSE Cell Change for LCS for GPRS, 3GPP TSG-GERAN Meeting #7, Tdoc G2-012712, Nov. 28, 2001, Cancun, Mexico.

ZTE, "Discussion on UE Positioning in Handover", 3GPP TSG RAN #67, R2-094728, Aug. 18, 2009, Shenzhen, China.

Qualcomm Europe, "Continuity at Handover for OTDOA", 3GPP TSG RAN WG2 #68, R2-096966, Nov. 9, 2009, Jeju, Korea.

* cited by examiner

POSITIONING NODE, USER EQUIPMENT AND METHODS THEREIN

This application is the U.S. national phase of International Application No. PCT/SE2011/050930, filed 8 Jul. 2011, which designated the U.S. and claims priority to SE Application No. PCT/SE2011/050725, filed 13 Jun. 2011; and claims the benefit of U.S. Provisional Application Nos. 61/374,037, filed 16 Aug. 2010 and 61/445,361, filed 22 Feb. 2011, the entire contents of each of which are hereby incorporated by reference.

TECHNICAL FIELD

Embodiments herein relate to a positioning node, a user equipment and methods therein. In particular, embodiments herein relate to enabling positioning of the user equipment.

BACKGROUND

In today's radio communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies. A radio communications network comprises radio base stations providing radio coverage over at least one respective geographical area forming a cell. User equipments (UE) are served in the cells by the respective radio base station and are communicating with respective radio base station. The user equipments transmit data over a radio interface to the radio base stations in uplink (UL) transmissions and the radio base stations transmit data to the user equipments in downlink (DL) transmissions.

The possibility of identifying a geographical location of a user equipment in the radio communications network has enabled a large variety of commercial and non-commercial services e.g. navigation assistance, social networking, location-aware advertising, emergency calls, etc. Different services may have different positioning accuracy requirements imposed by the positioning application. In addition, some regulatory requirements on the positioning accuracy for basic emergency services exist in some countries, e.g. 300 meters in Federal Communications Commission (FCC) Enhanced 9-1-1 in the United States.

In many environments, a user equipment's position may be accurately estimated by using positioning methods based on the Global Positioning System (GPS). Nowadays, radio communications networks also often have a possibility to assist user equipments in order to improve the user equipment's receiver sensitivity and GPS start-up performance, e.g. as Assisted-GPS (A-GPS) positioning do. GPS or A-GPS receivers may, however, not necessarily be available in all user equipments. Furthermore, GPS is known to often fail in indoor environments and urban canyons. A complementary terrestrial positioning method, called Observed Time Difference of Arrival (OTDOA), has therefore been standardized by 3rd Generation Partnership Project (3GPP). In addition to OTDOA, the LTE standard also specifies methods, procedures, and signaling support for Enhanced Cell ID (E-CID) and Assisted-Global Navigation Satellite System (A-GNSS) positioning. In the future, Uplink Time Difference of Arrival (UTDOA) may also be standardized for LTE, which is a real time locating technology that uses multilateration based on timing of received uplink signals. Multilateration is the process of locating an object by accurately computing the Time Difference Of Arrival (TDOA) of a signal emitted from that object to three or more receivers.

Three key network elements in an LTE positioning architecture are the Location Service (LCS) Client, the LCS target device and the LCS Server. The LCS Server is a physical or logical entity managing positioning for a LCS target device by collecting measurements and other location information, assisting the user equipment in measurements when necessary, and estimating the LCS target location. A LCS Client is a software and/or hardware entity that interacts with a LCS Server for the purpose of obtaining location information for one or more LCS target devices, i.e. the entities being positioned. LCS Clients may reside in the LCS target devices themselves. An LCS Client sends a request to LCS Server to obtain location information, and LCS Server processes and serves the received requests and sends the positioning result and optionally a velocity estimate to the LCS Client. A positioning request may be originated from the user equipment or any network node.

Position calculation may be conducted, for example, by a positioning node, e.g. LCS server, Enhanced Serving Mobile Location Centre (E-SMLC), Secure User Plane Location (SUPL) Location Platform (SLP) in LTE, or user equipment. The former approach corresponds to the UE-assisted positioning mode, whilst the latter corresponds to the UE-based positioning mode.

The OTDOA positioning method mentioned above makes use of the measured timing of downlink signals received from multiple radio base stations at the user equipment. The user equipment measures the timing of the received signals using positioning assistance data received from the positioning node, and the resulting measurements are used to locate the user equipment in relation to the neighbouring radio base stations. Thus, with OTDOA, the user equipment measures the timing differences for downlink reference signals received from multiple distinct locations. For each measured neighbour cell, the user equipment measures Reference Signal Time Difference (RSTD) which is the relative timing difference between neighbour cell and a reference cell. The estimate of the user equipment position is then found as the intersection of hyperbolas, which is a geometrical curve, corresponding to the measured RSTDs. At least three measurements from geographically dispersed radio base stations with a good geometry are needed to solve for two coordinates of the user equipment and the user equipment receiver's clock bias. In order to position the user equipment, precise knowledge of the transmitter locations and transmit timing offset is needed.

To enable positioning in LTE and facilitate a positioning measurement of a proper quality and for a sufficient number of distinct locations, new physical signals dedicated for positioning e.g. Positioning Reference Signals (PRS), have been introduced and low-interference positioning subframes have been specified in 3GPP.

PRSs are transmitted from one antenna port, e.g. antenna port R6, according to a pre-defined pattern. A frequency shift, which is a function of Physical Cell Identity (PCI), may be applied to the specified PRS patterns to generate orthogonal patterns and modeling the effective frequency reuse of six patterns, which makes it possible to significantly reduce neighbour cell interference on the measured PRS and thus improve a positioning measurement. Even though PRSs have been specifically designed for a positioning measurement and in general are characterized by better signal quality than other reference signals, the standard does not mandate using PRS.

Other reference signals, e.g. Cell-specific Reference Signals (CRS) may also be used for a positioning measurement.

PRSs are transmitted in a predefined pattern such as predefined positioning subframes grouped by a number N of consecutive subframes of PRS, NPRS for short, i.e. one positioning occasion. Positioning occasions occur periodically with a certain periodicity of the number N of subframes, i.e. the time interval between two positioning occasions. The standardized periods are 160, 320, 640, and 1280 ms stated in 3GPP TS 36.211 section 6.10.4.3, and the number of consecutive subframes are 1, 2, 4, and 6 as defined in 3GPP TS 36.355 section 6.5.1.2. Today, the user equipment may provide erroneous positioning measurements since the positioning measurements may rely on wrong assumptions made by the user equipment which may also be inconsistent with the information at the positioning node providing the positioning assistance data. Further, inconsistency in the implementation of the positioning parameters calculation with the network assumption on how the user equipment will do this may also lead to different interpretation of the parameters in the positioning assistance data by both sides and thus erroneous measurements in the end. The required positioning accuracy in a real network may thus not be ensured and the user equipment may not fulfill the positioning measurement requirements. In some systems this may be solved by a higher complexity in the user equipment e.g. the user equipment searches reference signals over a longer time to detect the reference signals. However, this will require more memory and more time and power for processing as well as this will likely to also violate positioning requirements such as measurement accuracy or measurement reporting delay requirements.

SUMMARY

An object of embodiments herein is to enable a positioning of a user equipment that is accurate in an efficient manner.

The object may be achieved according to some embodiments by a method in a positioning node for enabling positioning of a user equipment. The user equipment is served in a first cell controlled by a radio network node. The positioning node and the radio network node are comprised in a radio communications network. The radio network node obtains an indication indicating availability, at the user equipment, of timing information of at least one cell. The radio network node further determines whether the timing information of the at least one cell is available at the user equipment based on the obtained indication. The timing information is enabling positioning of the user equipment.

According to another aspect the object is achieved by providing a positioning node to perform the method above for enabling positioning of the user equipment. The user equipment is served in a first cell controlled by a radio network node. The positioning node comprises an obtaining circuit configured to obtain an indication indicating availability, at the user equipment, of timing information of at least one cell. The user equipment further comprises a determining circuit configured to determine whether the timing information of the at least one cell is available at the user equipment based on the obtained indication. The timing information is enabling positioning of the user equipment.

According to some embodiments herein the object is achieved by a method in a user equipment for enabling positioning of the user equipment. The user equipment and the positioning node are comprised in the radio communications network. The user equipment transmits, to the positioning node, an indication indicating availability, at the user equipment, of timing information of at least one cell. The timing information is enabling positioning of the user equipment.

According to some embodiments herein the object is achieved by a user equipment for enabling positioning of the user equipment. The user equipment is configured to be served in a first cell controlled by a radio network node. The user equipment comprises a transmitter configured to transmit, to a positioning node in the radio communications network, an indication. The indication indicates availability, at the user equipment, of timing information of at least one cell. The timing information is enabling positioning of the user equipment 10.

By obtaining the indication indicating availability at the user equipment of timing information of the at least one cell, the positioning node may e.g. provide positioning assistance data that is relevant and useful to the user equipment to be used when performing positioning measurement. Thus, embodiments herein enable an accurate positioning in an efficient manner.

BRIEF DESCRIPTION OF THE DRAWINGS

Embodiments will now be described in more detail in relation to the enclosed drawings, in which.

DETAILED DESCRIPTION

Figure 1:
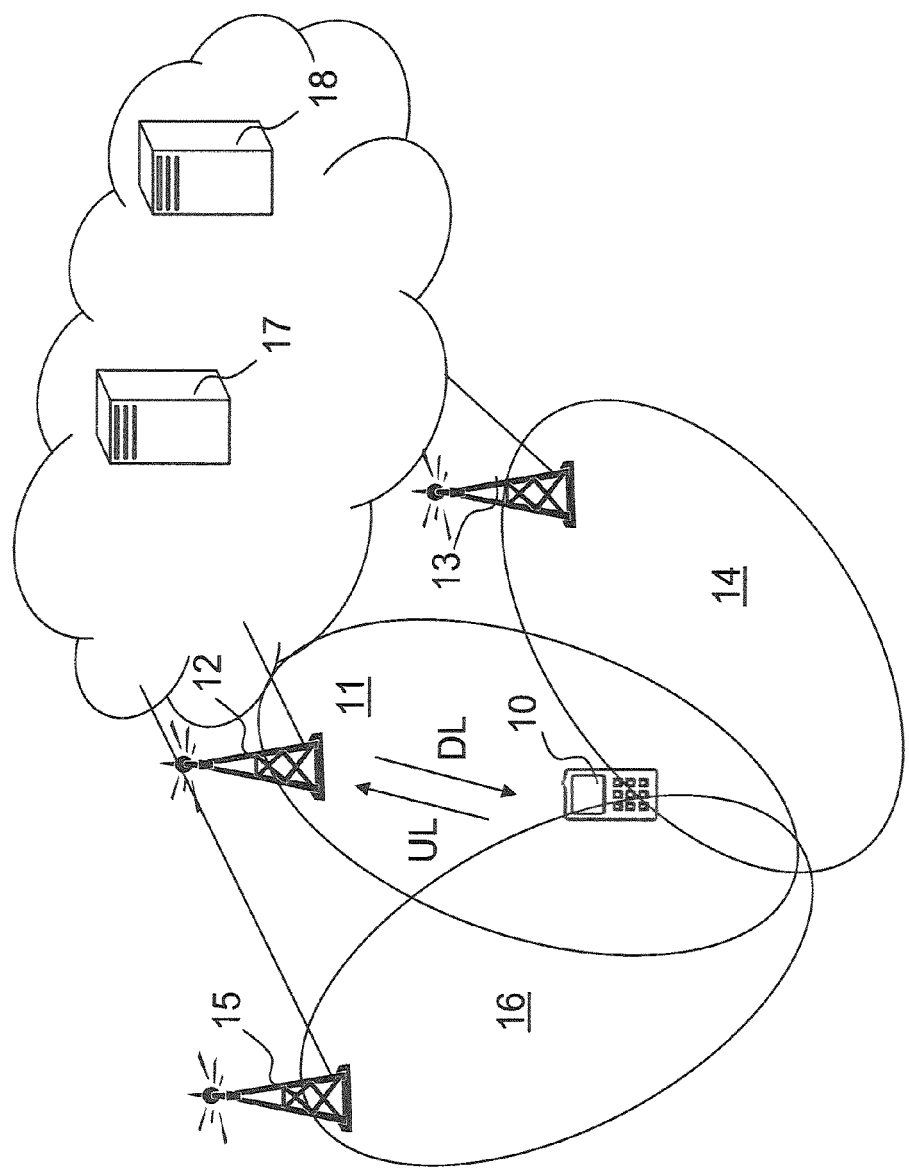
FIG. 1 is a schematic overview of a radio communications network.

FIG. 1 is a schematic overview of a radio communications network such as a Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), network just to mention a few possible implementations. The radio communications network comprises a radio network node, such as a first radio base station 12, providing radio coverage over at least one geographical area forming a first cell 11. A user equipment 10 is served in the first cell 11 by the first radio base station 12 and is communicating with the first radio base station 12. The first cell 11 is thus a serving cell to the user equipment 10 in this example. The user equipment 10 transmits data over a radio interface to the first radio base station 12 in an uplink (UL) transmission and the first radio base station 12 transmits data to the user equipment 10 in a downlink (DL) transmission. The radio communications network may further comprise a second radio base station 13. The second radio base station 13 may provide radio coverage over a second geographical area forming a second cell 14. The radio communications network may further comprise a third radio base station 15. The third radio base station 15 may provide radio coverage over a third geographical area forming a third cell 16. Furthermore, the radio communications network may comprise a positioning node 17 and a Mobility Management Entity (MME) 18 arranged in a core network of the radio communications network.

The positioning node 17 may also be exemplified as a Location Service (LCS) server, Server Mobile Location Centre (SMLC), Secure User Plane Location (SUPL) Location Platform (SLP) or any network node enabled to perform positioning of the user equipment 10.

It should be understood that the term "user equipment" is a non-limiting term which means any wireless terminal, device or node e.g. Personal Digital Assistant (PDA), laptop, mobile, sensor, relay, an LCS target device in general, an LCS client in the network or even a small base station that are being positioned. The user equipment 10 may be capable, but also not capable, of performing inter-frequency measurements without gaps, e.g. a user equipment capable of carrier aggregation.

The respective radio base station 12, 13, 15, which are examples of radio network nodes, may also be referred to as e.g. a NodeB, an evolved Node B (eNB, eNode B), a base transceiver station, Access Point Base Station, base station router, or any other network unit capable to communicate with the user equipment 10 within the cells 11, 14, 16 depending e.g. of the radio access technology and terminology used. Also, the respective radio base station 12, 13, 15 may further serve one or more cells and the radio network node serving the user equipment 10 may further be exemplified as a relay node or a beacon node.

According to embodiments herein, an indication about availability, in the user equipment 10, of timing information, such as System Frame Number (SFN) knowledge, of at least one cell is obtained by the positioning node 17.

The indication may comprise at least one of: an indication of whether the SFN is known or reliable, e.g. reliable enough for the positioning purpose, for a specific cell, e.g. the reference cell or a cell identified by Physical Cell ID (PCI); an indication of whether a serving cell is the cell for which the timing information is known; and/or an indication of whether the serving cell is a femto cell. The indication whether the serving cell is a femto cell may imply that the timing information is known or not known for the serving cell e.g. based on pre-defined positioning node behavior. The serving cell for which the timing information is known may also be one of a set of serving cells in a carrier aggregation system e.g. a primary cell or a secondary cell. The set of serving cells may also comprise cells associated with different radio base stations and/or non-co-located sites.

In addition to the indication, the positioning node 17 may obtain a Cell identification of the cell, e.g. PCI, for which the SFN is known, to identify the cell associated with the indication.

The positioning node 17 may obtain the indication e.g. by receiving signaling from the user equipment 10 e.g. via LTE Positioning Protocol (LPP), from a LCS Client in general or a radio network node, e.g. first radio base station 12 via LPPa which is an example of LPP, or other network nodes, e.g. MME 18. The positioning node 17 may request for the indication to be sent by sending a request to the user equipment 10, LCS Client in general or the first radio base station 12, or MME 18. The request may be sent to the first radio base station 12 via LPPa and the request may regard a specific cell e.g. requesting which cell is the cell serving the user equipment 10 or one or more cells for which the necessary timing information, e.g. SFN, is known to the user equipment 10.

The request may concern Observed Time Difference of Arrival (OTDOA) positioning, another positioning method, or all supported positioning methods in general.

Furthermore, the indication may be obtained without the positioning node 17 requesting the availability of timing information. For example, the indication may be obtained after a positioning session, e.g. a LPP session, or before the positioning session has been initiated from an LCS target, such as the user equipment 10 or LCS Client, in a positioning request. Furthermore, the indication may be obtained from the user equipment 10 or LCS client, in a request for positioning assistance data, e.g. a 'requestAssistanceData' message or 'otdoa-requestAssistanceData' message in LPP.

Additionally, the indication may further be obtained by autonomously identifying availability by the positioning node 17, e.g. the positioning node 17 always assumes that the timing information is not available for a specific type of cells, e.g. femto cells, or a cells with specific PCIs. For example, a group of such PCIs may be configured in the positioning node 17 or known from an Operation And Maintenance (OAM) node.

For enabling positioning of the user equipment 10 in the radio communications network the positioning node 17 may determine at least one cell for which timing information, such as the SFN, is known or is obtainable by the user equipment 10, i.e. the at least one cell indicated in the obtained indication. Then, the positioning node 17 may generate a message comprising positioning assistance data, which positioning assistance data comprises information associated with the at least one cell. The information may be represented by the at least one cell, e.g. cell identity, or other information identifying the at least one cell. The information may be transmitted in a separate information element e.g. in an information element of a LPP. The at least one cell may be indicated as a reference cell or in a neighbour cell list in e.g. an OTDOA assistance data. The positioning assistance data may also be referred to as assistance data and enables the user equipment 10 to perform positioning measurements. Furthermore, the positioning node 17 transmits the message to the user equipment 10 to be used for positioning the user equipment 10. In the illustrated example the first cell 11 serving the user equipment 10 is not a reference cell in the positioning assistance data, however, the reference cell in the positioning assistance data may be the cell serving the user equipment 10.

The user equipment 10 receives the message comprising positioning assistance data with the at least one cell for which the user equipment 10 knows the timing information or the timing information is obtainable. Knowing the timing information of at least one cell in the received positioning assistance data ensures that the user equipment 10 is able to perform e.g. RSTD measurements since the timing information is the basis for deriving at least some positioning parameters to enable RSTD calculation of the different cells. The user equipment 10 then performs a positioning measurement using the positioning assistance data and the timing information of the at least one cell e.g. the first cell 11, to enable positioning of the user equipment 10. The user equipment 10 may then perform corresponding positioning measurements of the second cell 14 and the third cell 16.

The user equipment 10 may then report the positioning measurement/s back to the positioning node 17 via the first radio base station 12. The positioning node 17 may then, based on the received positioning measurements, calculate the position of the user equipment 10. Alternatively or additionally, the user equipment 10 may calculate the position and report the position back to the first radio base station 12, e.g. in UE-based OTDOA embodiments.

The obtained indication may thus be used by the positioning node 17 when building up the positioning assistance data. For example, information of at least one of the cells indicated by the obtained indication may be included in the positioning assistance data and in some specific examples the at least one cell may be referred to as a reference cell in the positioning assistance data. Or information of at least one of the cells indicated by the obtained indication may be included in the positioning assistance data such that the cell with the known timing information appears at a specific positioning in a list of neighbour cells of the positioning assistance data.

Embodiments herein, in particular signaling to the positioning node 17, autonomous identification performed at the positioning node 17, and usage of the indication of the timing information awareness, may be applied in any network and network nodes that rely on the availability of the timing information of at least some cells, which, without signaling or autonomous identification, would not be able to provide a reliable positioning service.

Figure 2:
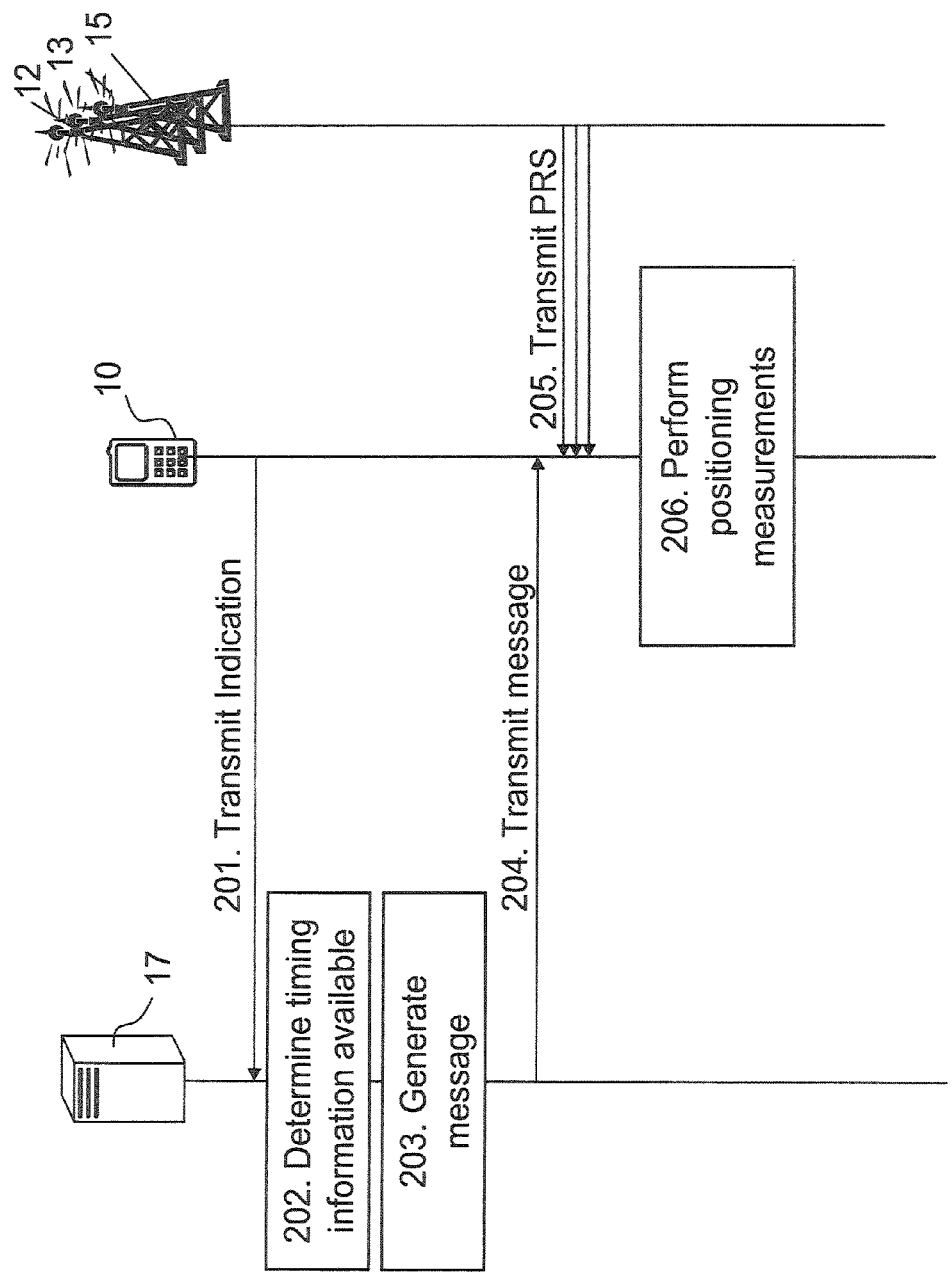
FIG. 2 is a schematic combined flowchart and signaling scheme in a radio communications network.

FIG. 2 is a schematic combined flowchart and signaling scheme depicting a process in a radio communications network.

Step 201. In the illustrated example the user equipment 10 knows the timing information of the second cell 14, and the user equipment 10 transmits an indication indicating availability at the user equipment 10 of timing information of the second cell 14. The indication may comprise a cell identity of the second cell 14 as well as an indication that the timing information is known for the second cell 14 by the user equipment 10.

Step 202. The first radio base station 12 determines whether the timing information of the second cell 14 is available at the user equipment 10 based on the indication. The timing information enables positioning of the user equipment 10 as the timing information is used to find reference signals for performing positioning measurements on. Thus, this may be used when to add or not to add information associated to a cell into positioning assistance data.

Step 203. The positioning node 17 may generate a message comprising positioning assistance data. For example, when the positioning node 17 determines that the user equipment 10 has the timing information for the second cell 14, the positioning node 17 may add information associated with the second cell 14 into a positioning assistance data. The positioning assistance data may e.g. be Observed Time Difference of Arrival (OTDOA) assistance data comprising a reference cell indication, information related to the reference cell, a neighbour cell list of neighbour cells and information related to the neighbour cells in the neighbour cell list. The second cell 14 may thus be indicated in the positioning assistance data as a reference cell or a cell in a neighbour cell list. The information may comprise system or measurement bandwidth of the second cell 14, bandwidth of a Positioning Reference Signal (PRS) of the second cell 14, periodicity of the PRS in the second cell 14, expected Reference Signal Time Difference (RSTD), RSTD uncertainty, and other information relating to the positioning involving the second cell 14. The positioning assistance data may be used to assist when measuring time difference of arrival of different reference signals of the cells comprised in the positioning assistance data. The neighbour cell list is used by the positioning node 17 to provide neighbour cell information for OTDOA assistance data. The message with the positioning assistance data may be triggered to be generated by a location service initiation from the MME 18 but may also be requested by the user equipment 10. For example, the MME 18 or the user equipment 10 may initiate a service to position the user equipment 10, i.e. a geographical location of the user equipment 10 is requested. The positioning node 17 may then receive an order from the MME 18 or the user equipment 10 to position the user equipment 10. The user equipment 10 may also send a request for positioning assistance data.

The positioning assistance data is intended to assist the user equipment 10 in its positioning measurements. Different sets of positioning assistance data is typically used for different methods. The positioning assistance data is typically sent by the positioning node 17, although it may be sent via other nodes. For example, the positioning assistance data may be sent via LPP to the first radio base station 12 for being further sent to the user equipment 10, e.g. transparently to the first radio base station 12 and also the MME 18. The positioning assistance data may also be sent by the first radio base station 12 via LPPa to positioning node 17 for further transfer to the user equipment 10. The positioning assistance data may be sent on a request from the user equipment 10 that will perform measurements or in an unsolicited way. In e.g. LTE, the positioning assistance data may be requested and provided over LPP protocol by including RequestAssistanceData and ProvideAssistanceData elements in the LPP message, respectively. The current LTE standard specifies the following structure for ProvideAssistanceData:

```
ProvideAssistanceData-r9-IEs ::= SEQUENCE {
commonIEsProvideAssistanceData    CommonIEsProvideAssistanceData OPTIONAL,
-- Need ON
a-gnss-ProvideAssistanceData      A-GNSS-ProvideAssistanceData   OPTIONAL,
-- Need ON
otdoa-ProvideAssistanceData OTDOA-ProvideAssistanceData          OPTIONAL,
-- Need ON
epdu-Provide-Assistance-Data      EPDU-Sequence                  OPTIONAL,
-- Need ON
...
}
``` where the commonIEsProvideAssistanceData Information element (IE) is provided for future extensibility only and not used so far. The LTE positioning assistance data may thus be provided for A-GNSS, A-GNSS-ProvideAssistanceData, and OTDOA, OTDOA-ProvideAssistanceData. The External Protocol Data Unit (EPDU)-Sequence contains Information Elements (IE) that are defined externally to LPP by other organizations, which currently may only be used for Open Mobile Alliance (OMA) LPP extensions (LPPe).

A similar structure exists for RequestAssistanceData:

```
RequestAssistanceData-r9-IEs ::= SEQUENCE {
commonIEsRequestAssistanceData  CommonIEsRequestAssistanceData  OPTIONAL,
-- Need ON
a-gnss-RequestAssistanceData    A-GNSS-RequestAssistanceData    OPTIONAL,
-- Need ON
otdoa-RequestAssistanceData     OTDOA-RequestAssistanceData     OPTIONAL,
-- Need ON
epdu-RequestAssistanceData      EPDU-Sequence                   OPTIONAL,
-- Need ON
...
}
``` where commonIEsRequestAssistanceData may optionally carry the serving cell ID e.g. E-UTRAN Cell Global Identifier (ECGI). The LTE positioning assistance data may thus be requested for A-GNSS, A-GNSS-RequestAssistanceData, and OTDOA, OTDOA-RequestAssistanceData. The External Protocol Data Unit (EPDU)-Sequence contains Information Elements (IE) that are defined externally to LPP by other organizations as stated above.

Since for OTDOA positioning PRS signals from multiple distinct locations are measured, the user equipment receiver may have to deal with PRS that are much weaker than those received from the serving cell, e.g. first cell 11. Furthermore, without the approximate knowledge of when the measured signals are expected to arrive in time and what is the exact PRS pattern, the user equipment 10 would need to do signal search within a large window which would impact the time and accuracy of the measurements as well as the user equipment complexity. To facilitate measurements at the user equipment 10, the network transmits positioning assistance data to the user equipment 10, which includes, among the others, reference cell information, neighbour cell list comprising Physical Cell IDs (PCI) of neighbour cells, the number of consecutive downlink subframes, PRS transmission bandwidth, frequency, etc.

In OTDOA assistance data some parameters, such as timing of positioning occasions in a neighbour cell, are specified relative to the reference cell. At the same time, to identify the timing of the reference cell positioning occasion, timing information such as an absolute timing of the reference cell has to be known. When the absolute timing of the reference cell is not known but it is available for some other cell in the positioning assistance data, the timing of the reference cell may be derived and may then be used for other cells for which only the relative timing is known. Thus, the absolute timing of at least one cell included in the positioning assistance data needs to be known. The positioning node 17 includes information of at least the second cell 14 for which the timing information may be obtained by the user equipment 10 in the positioning assistance data, e.g. either as a reference cell or in the neighbour cell list. Otherwise the user equipment 10 will be unable to perform the OTDOA measurement and the positioning operation will fail.

Alternatively or additionally, the positioning node 17 may add information associated with the serving cell 11 in the positioning assistance data as the user equipment 10 typically knows the absolute timing for the serving cell 11. In a carrier aggregation system, multiple serving cells exist and comprise one primary cell, for which the timing information is typically known to the user equipment 10, and one or more secondary cells for which the exact timing information may or may not be available. So, in the example, the serving cell 11 may also be any one of the set of serving cells. The user equipment 10 synchronizes to a cell by performing correlation of the synchronization sequences. After performing the cell synchronization the user equipment 10 typically acquires the timing information such as the Subframe Number (SFN) of the serving cell 11 by reading the system information sent in the first cell 11. The SFN is transmitted in the Master Information Block (MIB), which in turn is sent over a Physical Broadcast Channel (PBCH). The PBCH is transmitted with a periodicity of 40 ms with a repetition in subframe #0 of every frame within 40 ms.

In Radio Resource Control (RRC) idle mode before camping on a cell the user equipment 10 reads its broadcast channel, which contains the system information. Any change in the system information is indicated to the user equipment 10 by the sending a page message to the user equipment 10. In response to the page the user equipment 10 reads the system information again. In RRC connected mode, the user equipment 10 acquires the system information via a UE specific dedicated channel. Hence, typically and by default the user equipment 10 does not read the system information of the cell. However it is possible for the network, e.g. the first radio base station 12, to request the user equipment 10 to acquire and report the system information of the neighbour cell, e.g. the second cell 14.

The user equipment 10 generally does not read the system information of neighbour cells or secondary cells as this increases UE power consumption and requires more complex implementation. The system information of a neighbour cell is only acquired by the user equipment 10 upon receiving special request from the serving cell 11, i.e. the first radio base station 12.

For E-CID, there are intra-frequency UE Rx-Tx accuracy and reporting delay requirements. No inter-frequency requirements are currently defined for Rx-Tx measurements of the user equipment 10 or the first radio base station 12. Inter-frequency and inter-RAT requirements and also positioning assistance data for E-CID measurements may also be defined. Intra-frequency means within the same frequency and inter-frequency means within different frequencies. So, the embodiments described herein may then also apply e.g. for E-CID timing measurements such as UE Rx-Tx measurements, eNodeB Rx-Tx measurements, Timing Advance Type 1 or Timing Advance Type 2 measurements.

OTDOA uses RSTD measurements performed by the user equipment 10. For UE-assisted OTDOA, i.e. when the user equipment 10 reports the measurements to the positioning node 17, the following requirements have been defined: Intra-frequency RSTD accuracy requirements, Inter-frequency RSTD accuracy requirements, Intra-frequency RSTD reporting delay requirements for Frequency Division Duplex (FDD), Intra-frequency RSTD reporting delay requirements for Time Division Duplex (TDD), Inter-frequency RSTD reporting delay requirements for FDD-FDD, Inter-frequency RSTD reporting delay requirements for TDD-FDD, Inter-frequency RSTD reporting delay requirements for TDD-TDD, and Inter-frequency RSTD reporting delay requirements for FDD-TDD.

For each of the inter-frequency requirements, two scenarios are considered: Scenario 1: inter-frequency RSTD measurements are performed over the reference cell and neighbour cells, which belong to an inter-frequency carrier frequency f2; Scenario 2: inter-frequency RSTD measurements are performed over the reference cell and the neighbour cells, which belong to a serving carrier frequency f1 and the inter-frequency carrier frequency f2, respectively.

Scenario 1 corresponds to Note 1 in, e.g., Table 1, while Scenario 2 corresponds to Note 2 in the same table, see below.

The requirements are generic with respect to the frequency channels and frequency bands, i.e. the requirements are the same for any two different frequencies, independently on their absolute and relative location in the spectrum, e.g. being common for inter-frequency intra-band and inter-band. This generic approach with regard to the frequency channels and bands has been used for the specification of the other measurement requirements e.g. mobility measurement requirements such as Reference Signal Received Power (RSRP) and Reference Signal Received Quality (RSRQ) in LTE. Note also that the requirements are currently common for inter-frequency. Furthermore, there may also be inter-Radio Access Technology (RAT) measurements, e.g. when the user equipment 10 is connected to CDMA and performs LTE RSTD measurements.

To ensure that the positioning requirements are met, test cases are specified by the standard, based on which the user equipments are tested. The currently specified positioning test cases assume that the timing information for at least one cell in the positioning assistance data is known to the user equipment 10. That is, the user equipments in the tests are not required to acquire the timing information of any of the cells. In these tests the user equipment 10 is required to report the positioning measurements, i.e. RSTD, within the test requirements. Failure to do so shall lead to the failure of the test. Hence, if prior to the start of the actual test the user equipment 10 under test does not have the timing information of any of the cells to be measured for positioning, then it is quite likely that the user equipment 10 will fail the test.

An example when the serving cell is not in the positioning assistance data is one of the scenarios for which inter-frequency RSTD requirements are specified. The scenario implies that all cells in the OTDOA assistance data, including the reference cell, operate on a frequency different from the serving-cell frequency, see e.g. 3GPP TS 36.133, Section 8.1.2.6.1, Table 1, Note 1, which means that none of the cells in the OTDOA assistance data may be the serving cell in this scenario.

TABLE 1

Number of PRS positioning occasions within $T_{RSTD\ InterFreqFDD,\ E\text{-}UTRAN}$ [3GPP TS 36.133, Table 8.1.2.6.1-1]

| Positioning subframe configuration period $T_{PRS}$ | Number of PRS positioning occasions M | |
|---|---|---|
| | f2 [Note1] | f1 and f2 [Note2] |
| 160 ms | 16 | 32 |
| >160 ms | 8 | 16 |

Note 1
When inter-frequency RSTD measurements are performed over the reference cell and neighbour cells, which belong to the FDD inter-frequency carrier frequency f2.

Note 2
When inter-frequency RSTD measurements are performed over the reference cell and the neighbour cells, which belong to the serving FDD carrier frequency f1 and the FDD inter-frequency carrier frequency f2 respectively.

Another example when the serving cell is likely to be not included in the positioning assistance data is when the serving cell is a femto cell, independently on the frequency on which the femto cell is operating, since the timing accuracy for femto cells is typically lower than e.g. for macro cells. Further, the timing relation between a femto cell and other cells that may need to be included in the positioning assistance data may be not known to the first radio base station 12 in case of non-coordinated or user-deployed femto cells.

The user equipment 10 may acquire e.g. the SFN of the reference cell received in the positioning assistance data, if the SFN of the reference cell is not yet known to the user equipment 10. This may be the case when the reference cell is not the serving cell 11. Acquiring the SFN of a cell may e.g. be done by reading the broadcast channel of that cell. The acquiring the SFN of the reference cell may be triggered by receiving the positioning assistance data, given that e.g. the SFN of the reference cell is not known to the user equipment 10, the serving cell 11 is not in the positioning assistance data, and/or there is no other cell in the positioning assistance data for which the SFN is known to the user equipment 10.

With Open Mobile Alliance (OMA) LPP extension, the positioning assistance data is enhanced with the possibility to assist a larger range of positioning methods, e.g. positioning assistance data may also be provided for OTDOA, E-CID or other methods of other Radio Access Technologies (RAT), e.g. OTDOA Terrestrial Radio Access Network for Universal Mobile Telecommunication Services (UTRA) or Enhanced Observed Time Difference (E-OTD) Global System for Mobile Communication (GSM), or other Public Land Mobile Network (PLMN) networks. Furthermore, there is also a possibility of carrying over a black-box data container meant for carrying vendor-/operator-specific positioning assistance data. In some embodiments, the indication described herein may also be provided by means of LPP extension.

Inter-Frequency, Inter-Band and Inter-RAT Measurements

It is mandatory for all user equipments to support all intra-RAT measurements, i.e. inter-frequency and intra-band measurements, and meet the associated requirements. However the inter-band and inter-RAT measurements are UE capabilities, which are reported to the network during the call setup. If the user equipment 10 supports certain inter-RAT measurements, the user equipment 10 should meet the corresponding requirements. For example the user equipment 10 supporting LTE and WCDMA should support intra-LTE measurements, intra-WCDMA measurements and inter-RAT measurements i.e. measuring WCDMA when serving cell 11 is LTE and measuring LTE when serving cell 11 is WCDMA. Hence network may use these capabilities according to its strategy. These capabilities are highly driven by factors such as market demand, cost, typical network deployment scenarios, frequency allocation, etc.

Inter-frequency measurements may in principle be considered for any positioning method, even though currently not all measurements are specified by the standard as intra- and inter-frequency measurements. The examples of inter-frequency measurements currently specified by the standard are Reference Signal Time Difference (RSTD) used for OTDOA, RSRP and RSRQ which may be used e.g. for fingerprinting or E-CID.

The user equipment 10 performs inter-frequency and inter-RAT measurements in measurement gaps. The measurements may be done for various purposes: mobility, positioning, Self-Organizing Network (SON), minimization of drive tests etc. Furthermore, the same gap pattern is used for all types of inter-frequency and inter-RAT measurements. Therefore E-UTRAN must provide a single measurement gap pattern with constant gap duration for concurrent monitoring, i.e. cell detection and measurements, of all frequency layers and RATs.

In LTE, measurement gaps are configured by a network node to enable measurements on the other LTE frequencies and/or other RATs, e.g. UTRA, GSM, CDMA2000, etc. The gap configuration is signaled to the user equipment 10 over RRC protocol as part of the measurement configuration. The user equipment 10 that requires measurement gaps for positioning measurements, e.g. OTDOA, may send an indication to the network, e.g. the first radio base station 12, upon which the network may configure the measurement gaps. Furthermore, the measurement gaps may need to be configured according to a certain rule, e.g. inter-frequency RSTD measurements for OTDOA require that the measurement gaps are configured according to the inter-frequency requirements in 36.133, Section 8.1.2.6, e.g. not overlapping with PRS occasions of the serving cell and using gap pattern #0.

In general, in LTE inter-RAT measurements are typically defined similar to inter-frequency measurements, e.g. they may also require configuring measurement gaps like for inter-frequency measurements, but just with more measurements restrictions and often more relaxed requirements for inter-RAT measurements. As a special example, there may also be multiple networks using the overlapping sets of RATs. The examples of inter-RAT measurements specified currently for LTE are UTRA FDD Common Pilot Channel (CPICH) Received Signal Code Power (RSCP), UTRA FDD carrier Received Signal Strength Indicator (RSSI), UTRA FDD CPICH Energy per Chip-to-Total Noise and Interference power spectral density (Ec/No), GSM carrier RSSI, and CDMA2000 1× Radio Transmission Technology (RTT) Pilot Strength.

For positioning, assuming that LTE FDD and LTE TDD are treated as different RATs, the current standard defines inter-RAT requirements only for FDD-TDD and TDD-FDD measurements, and the requirements are different in the two cases. There are no other inter-RAT measurements specified within any separate RAT for the purpose of positioning and which are possible to report to the positioning node 17.

Inter-band measurement refers to the measurement done by the user equipment 10 on a target cell on the carrier frequency belonging to the frequency band which is different than that of the serving cell 11. Both inter-frequency and inter-RAT measurements may be intra-band or inter-band.

The motivation of inter-band measurements is that most of the user equipments s today support multiple bands even for the same technology. This is driven by the interest from service providers; a single service provider may own carriers in different bands and would like to make efficient use of carriers by performing load balancing on different carriers. A well-known example is that of multi-band GSM terminal with 800/900/1800/1900 bands.

Furthermore user equipment 10 may also support multiple technologies e.g. GSM, UTRA FDD and E-UTRAN FDD. Since all UTRA and E-UTRA bands are common, therefore a multi-RAT user equipment may support same bands for all the supported RATs.

There is a requirement on the OTDOA assistance data that it includes the at least one cell for which the timing information is known e.g. the serving cell 11 or second cell 14, or for which the timing information is obtainable by the user equipment 10. However, there are practical scenarios and also scenarios covered by the existing requirements e.g., inter-frequency RSTD Scenario 1, where the serving cell 11 may be not included, and it is not straightforward for positioning node 17: whether the user equipment 10 can obtain the timing information for a given cell, and for which cells the user equipment 10 can obtain the timing information.

Some embodiments herein allow the user equipment 10 to indicate to the positioning node 17 for which cell or cells the timing information, such as SFN, is known.

Next, some elements of OTDOA positioning assistance data are described in more detail. The positioning assistance data may comprise a prs-MutingInfo element. The current definition of the prs-MutingInfo element in 3GPP TS 36.355 section 6.5.1.2 says that muting sequence is defined with respect to the SFN0 of the reference cell. However, it may happen that the timing information, e.g. SFN, of the reference cell is not known to the user equipment 10, but the positioning node 17 which provides the muting sequence may be not aware of this.

The prs-MutingInfo element specifies the PRS muting configuration of the cell. The PRS muting configuration is defined by a periodic PRS muting sequence with a periodicity $T_{REP}$ where $T_{REP}$, counted in the number of PRS positioning occasions, may be 2, 4, 8, or 16 which is also the length of the selected bit string that represents this PRS muting sequence. If a bit in the PRS muting sequence is set to "0", then the PRS is muted in the corresponding PRS positioning occasion. A PRS positioning occasion comprises of NPRS downlink positioning subframes. The first bit of the PRS muting sequence corresponds to the first PRS positioning occasion that starts after the beginning of the positioning assistance data reference cell SFN=0. The muting sequence is valid for all sub-frames after the user equipment 10 has received the prs-MutingInfo element. If this field is not present the user equipment 10 may assume that the PRS muting is not in use for the cell.

When the SFN of the reference cell in the positioning assistance data is not known to the user equipment 10 and prs-MutingInfo element is provided for a cell in the OTDOA-NeighbourCellInfoList IE, the user equipment 10 may assume no PRS is transmitted by that cell. The reference cell in the positioning assistance data may be not the serving cell or the cell for which the timing information is known to the user equipment 10, and in this case the prior-art UE will be unable to determine the timing of muting occasions indicated in the positioning assistance data since in the prior art the muting patterns are specified with respect to SFN=0 of the reference cell. Some embodiments herein allow the user equipment 10 to deal with this situation and use the positioning assistance data provided by the network.

The positioning assistance data may in some cases not include the serving cell 11 at all. In such cases the user equipment 10 may have to acquire the timing information of the reference cell. However in prior art the positioning node 17 sends the positioning assistance data to user equipment 10 without accounting for the time required by the user equipment 10 for acquiring the timing information of the reference cell. This may lead to longer than expected time to perform RSTD measurements as user equipment 10 may not be able to use all possible positioning occasions containing the PRS for RSTD measurements. The user equipment 10 may report the RSTD measurements beyond the expected or specified reporting delay to the positioning node 17, resulting in that the positioning node 17 may even send another request or generate a failure case. This is particularly critical in case of inter-frequency OTDOA measurements since the acquisition of the timing information may require several seconds in case of inter-frequency.

The user equipment 10 may not always know the exact timing of the serving cell 11 either, e.g. when the serving cell 11 is a femto cell, so even if the network knows the serving cell 11, it may not reliably always rely on that the user equipment 10 has the exact SFN of the serving cell 11.

Further, in a carrier aggregation system, there may be multiple serving cells and the user equipment 10 may not have the exact timing information for all of them.

The currently specified positioning test cases assume that the timing information is available for at least one cell in the provided positioning assistance data and the test configurations do not allow for acquiring the timing information. Consider a test case where the user equipment 10 does not have prior information about the timing information of none of the reference and neighbouring cells. During the test the user equipment 10 should therefore first acquire the timing information of at least one cell e.g. reference cell. In such test if the test equipment or the system simulator emulating the positioning node 17 sends the positioning assistance data to the user equipment 10 using the prior art mechanism then the user equipment 10 which is though compliant to the OTDOA core requirements may fail the test. Embodiments herein enable positioning test cases for verifying that the user equipment 10 is capable of acquiring the timing information for at least one of intra-frequency neighbour cells. Embodiments herein enable positioning test cases for verifying that the user equipment 10 is capable of acquiring the timing information for at least one of inter-frequency intra-band neighbour cells. Embodiments herein enable positioning test cases for verifying that the user equipment 10 is capable of acquiring the timing information for at least one of inter-frequency inter-band neighbour cells. Embodiments herein enable positioning test cases for verifying that the user equipment 10 is capable of acquiring the timing information for at least one of inter-RAT neighbour cells. Embodiments herein enable positioning test cases for verifying that a carrier aggregation UE is capable of acquiring the timing information for at least one of neighbour cells which operate on the primary carrier or on any of the secondary component carrier. Embodiments herein enable positioning test cases for verifying that the user equipment 10 is capable of acquiring the timing information of at least one of the neighbour cell and at the same time meet the corresponding intra- or inter-frequency RSTD requirements.

When the user equipment 10 realizes that there is no cell in the positioning assistance data for which the timing information is known to the user equipment 10, it is not always straightforward for which cell the timing information is to be acquired. The user equipment 10 may acquire the timing information for the reference cell. However, the positioning assistance data may comprise cell on up to 4 frequencies and potentially multiple RATs, where the RATs may or may not be limited to LTE. Note that LTE FDD and LTE TDD are also considered as different RATs. The user equipment 10 may also receive complementary assistance data in LPPe, comprising more cells, delivered in the same LPP message.

Embodiments herein describe signaling means to allow the user equipment 10 or the LCS Client, to indicate for which cell(s) the timing information such as SFN is known. Also, methods in the positioning node 17 using the indication to generate and/or arrange the positioning assistance data are disclosed. Furthermore, embodiments herein discuss requirements applicability, e.g., intra-frequency or inter-frequency;

Step 204. The positioning node 17 transmits the message to the user equipment 10. The message comprises the positioning assistance data enabling positioning of the user equipment 10.

Step 205. The different radio base stations 12, 13, 15 respectively transmit Positioning Reference Signals (PRS) or other reference signals such as Cell-specific Reference Signals (CRS).

Step 206. The user equipment 10 may then perform time measurements on the transmitted PRS transmitted from the different radio base stations 12, 13, 15. Thus, the user equipment 10 may perform a positioning measurement e.g. the user equipment 10 may measure the time difference of arrival of the reference signals, also referred to as Reference Signal Time Difference (RSTD) measurements, from respective radio base stations 12, 13, 15. This is enabled from the received message with the positioning assistance data. And as the timing information known or is obtainable by the user equipment 10 and also with the aid of references signal information in the positioning assistance data, the user equipment 10 knows when in time to measure a PRS or CRS of the second cell 14. The user equipment 10 may know offset timings and similar information of the first cell 11 and third cell 16, relative to the second cell 14, and thus the user equipment 10 may also determine when to perform measurements on PRSs of the first cell 11 and third cell 16.

The user equipment 10 may then report and transmit the RSTD measurements of the received PRS sequences to the positioning node 17 for example via the first radio base station 12. The positioning node 17 may receive the RSTD measurements and calculates position of the user equipment 10 based on the received RSTD measurements. For example, the RSTD measurements in combination with the geographical location of the radio base stations 12, 13, 15 and the time that the radio base stations 12, 13, 15 transmitted the PRS sequence gives the positioning node 17 the location or position of the user equipment 10. The position may, additionally or alternatively, be calculated in the user equipment 10 when the user equipment 10 has or may obtain the necessary information about the radio network nodes e.g. the locations of the radio base stations 12, 13, 15.

Figure 3:
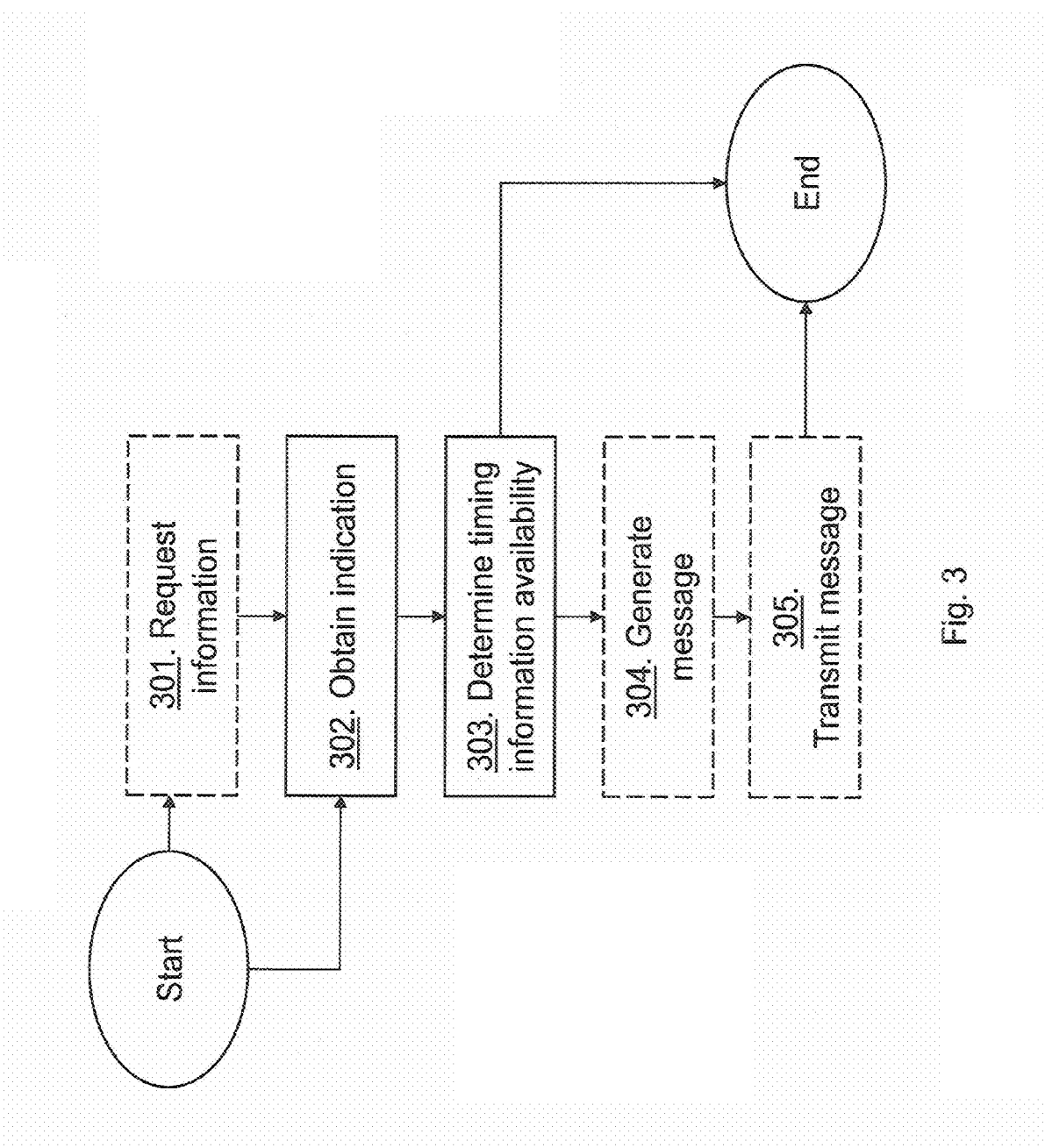
FIG. 3 is a schematic flowchart of a method in a positioning node.

The method steps in the positioning node 17 for enabling positioning of a user equipment 10, according to some general embodiments will now be described with reference to a flowchart depicted in FIG. 3. The user equipment 10 is served in a first cell 11 controlled by the radio network node 12. The positioning node 17 and the radio network node 12 are comprised in the radio communications network. The steps do not have to be taken in the order stated below, but may be taken in any suitable order. The steps that are performed in some embodiments are indicated with dashed boxes in FIG. 3.

Step 301. In some embodiments the positioning node 17 requests information associated with availability of timing information of the at least one cell 11, 14 to obtain the indication. The request may be sent to the user equipment 10 or a LCS client in general or a radio network node, e.g. first radio base station 12, or other network node, e.g. MME 18. The request may be sent e.g. to the first radio base station 12 or the second radio base station 13 via LPPa. The request may relate to a specific cell e.g. requesting which cell is serving the user equipment 10. Furthermore, the request may concern OTDOA or other positioning method or all supported positioning methods in general.

Step 302. The positioning node 17 obtains an indication indicating availability, at the user equipment 10, of timing information of at least one cell 11, 14. In e.g. LTE, the timing information may comprise the SFN information. The indication may comprise at least one of or a combination of: Cell identification of a cell e.g. PCI, for which the SFN is known; Indication on whether the SFN is known or reliable, e.g. reliable enough for the positioning purpose, for a specific cell, e.g. the reference cell or a cell identified by PCI; Indication on whether the serving cell is the cell for which the timing information is known; or Indication on whether the serving cell is a femto cell. That the serving cell is a femto cell may or may not imply, e.g. based on pre-defined positioning node behaviour, that the timing information is known for the serving cell. Thus, in some embodiments the positioning node 17 obtains the indication by identifying the at least one cell 11, 14 as a specific type of cell based on an identity of the at least one cell 11, 14. Type of cell is defined as capability or capacity of the cell, e.g. macro cell, micro cell, pico cell, or femto cell. The at least one cell 11, 14 may in some embodiments be either a serving cell for user equipment 10 not configured for carrier aggregation or a cell belonging to a set of serving cells for the user equipment 10 in a carrier aggregation system but not necessarily the primary cell for the user equipment 10.

The indication about the timing information availability may be obtained, e.g. by signaling from the user equipment 10 or a LCS client in general or a radio network node, e.g. first radio base station 12, or other network nodes, e.g. MME 18. The indication may be requested in at least one of the following ways: as stated in step 301, on request for timing information sent from the positioning node 17 to at least one of the user equipment 10 or a LCS client in general or a radio network node, e.g. first radio base station 12, or other network node, e.g. MME 18. The indication may be obtained without a request for the timing information, e.g. provided after a positioning session e.g. a LPP session, or before the positioning session has been initiated. For example, from an LCS target e.g. the user equipment 10 or LCS Client, in a positioning request. In another example the indication is obtained from the LCS target in a request for positioning assistance data, e.g. requestAssistanceData or otdoa-requestAssistance-Data in LPP.

The indication may be obtained by autonomously identifying availability by the positioning node 17. The positioning node 17 may e.g. always assume that the timing information is not available for a specific type of cells, e.g. femto cells, or a cells with specific PCIs. For example, a group of such PCIs may be configured in the positioning node 17 or known from an OAM node or Self Organizing Network (SON) node.

Step 303. The positioning node 17 determines whether the timing information of the at least one cell 11, 14 is available at the user equipment 10 based on the obtained indication. As stated above the timing information enables positioning of the user equipment 10. In some embodiments the positioning node 17 determines whether the timing information is available by comparing the identity of the at least one cell 11, 14 with an identity. The identity indicates availability of the timing information. The identity may be stored at the positioning node 17. In some embodiments the positioning node 17 checks whether the timing information/indication is up to date, e.g., comparing an elapsed time after receiving the indication to a threshold.

Step 304. In some embodiments, when the positioning node 17 determines that the timing information of the at least one cell 11, 14 is available at the user equipment 10, the positioning node 17 generates positioning assistance data. The positioning assistance data comprises information associated with the at least one cell 11, 14. The generated positioning assistance data may an indication of a reference cell and a list of neighbour cells. The at least one cell 11, 14 with the available timing information may be at a pre-defined position in the list of neighbour cells and timing information of the reference cell is not known or the reference cell is not a cell serving the user equipment 10 and not a primary cell for the user equipment 10 if it is configured with carrier aggregation. Furthermore, the generated positioning assistance data may comprise information regarding muting sequence of at least some of the cells, where the at least one cell 14 with the available timing information is comprised only in the list of neighbour cells in the positioning assistance data. Information regarding muting sequence of another neighbour cell in the positioning assistance data is generated with respect to or relative to the information of the at least one cell 14.

For example, if timing information of the reference cell is not available and the muting information for a neighbour cell is included in the positioning assistance data, the user equipment 10 may have to acquire the timing information, e.g. read the system information in the reference cell. In some embodiments, the muting information may be provided in the positioning assistance data with respect to a cell other than the reference cell, but the user equipment 10 knows exactly with respect to which cell, e.g. a certain position in the list. Otherwise the user equipment 10 does not know the reference time for the muting sequence and thus does not know when exactly PRS are muted even if the user equipment 10 does know the periodicity and the sequence of muted PRS. The at least one cell may be indicated by other means, e.g. by a flag, in the positioning assistance data so that e.g. muting may be defined with respected to the indicated cell, which is not necessarily the reference cell, in the positioning assistance data. Embodiments herein facilitate for the user equipment 10 to acquire the timing information when the timing information is not available for the user equipment 10. For example: if the reference cell is on a non-serving cell frequency, it is more difficult to acquire the timing information of this reference cell than to do this for an intra-frequency cell, and the muting sequence of the intra frequency cell may e.g. be provided with respect to a cell in the positioning assistance data list and this cell may be intra-frequency; timing information may be available for the cell and not for reference cell. Even if timing information is not available for the cell, it is still easier to acquire the timing information for the user equipment 10 for the intra frequency cell than to do this for the reference cell in this example.

The muting sequence may be signaled from the positioning node 17 to the user equipment 10 via LPP. Muting sequences may be determined by respective radio base station 12, 13, 15 which are then sent to positioning node 17 via LPPa or muting sequences may be known to the positioning node 17, e.g. statically defined or obtained from an OAM node. According to embodiments herein the positioning assistance data is created based on the knowledge about the availability of the timing information for cells in the user equipment 10. In radio communications networks, if it is likely that the user equipment 10 does not know the timing information of a cell and there are neighbour cells using muting, then it is likely that either the cell for which the timing information is not known cannot be the reference cell as positioning accuracy may be degraded. Additionally or alternatively in today's radio communications networks, a cell exercising muting may not be included in the positioning assistance data so the user equipment 10 does not measure the cell resulting in that positioning accuracy may be degraded, or such positioning assistance data may trigger the user equipment 10 to obtain the SFN of the reference cell e.g. reading the system information of the reference cell which is time and resource consuming. Embodiments herein make it possible to avoid the above described restrictions on the positioning node 17 for configuring positioning assistance data.

Step 305. The positioning node 17 may in some embodiments transmit a message to the user equipment 10. The message comprises the positioning assistance data, which positioning assistance data and the timing information of the at least one cell 11, 14 available at the user equipment 10 enables positioning of the user equipment 10.

Figure 4:
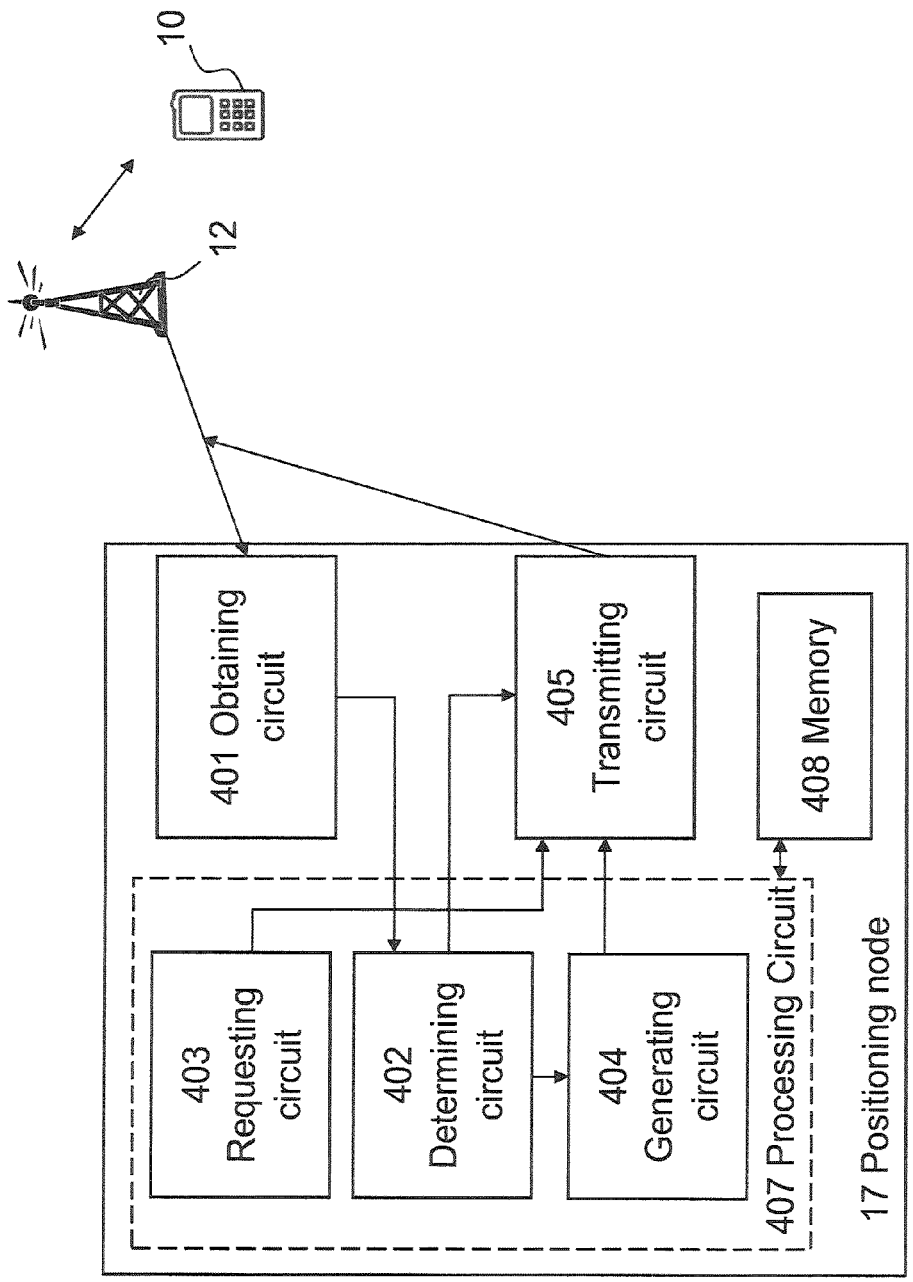
FIG. 4 is a block diagram depicting a positioning node.

FIG. 4 is a block diagram depicting the positioning node 17 for enabling positioning of a user equipment 10. The user equipment 10 is served in a first cell 11 controlled by a radio network node 12.

The positioning node 17 comprises an obtaining circuit 401 configured to obtain an indication indicating availability, at the user equipment 10, of timing information of at least one cell 11, 14. The obtaining circuit 401 may further be configured to receive the indication from the user equipment 10, the radio network node 12 or a network node.

The positioning node 17 further comprises a determining circuit 402 configured to determine whether the timing information of the at least one cell 11, 14 is available at the user equipment 10 based on the obtained indication. The timing information enables positioning of the user equipment 10. Furthermore, the determining circuit 402 may be configured to check whether the timing information/indication is up to date e.g. by comparing an elapsed time after receiving the indication to a threshold stored at the positioning node 17.

The at least one cell 11, 14 may in some embodiments be either a serving cell for user equipment 10 not configured for carrier aggregation or a cell belonging to a set of serving cells for the user equipment 10 in a carrier aggregation system but not necessarily a primary cell for the carrier aggregation for the user equipment 10.

In some embodiments may the obtaining circuit 401 be configured to identify the at least one cell 11, 14 as a specific type of cell based on an identity of the at least one cell 11, 14. The determining circuit 402 may then be configured to compare the identity of the at least one cell 11, 14 with an identity, which identity indicates availability of the timing information.

Furthermore, the positioning node 17 may further comprises a requesting circuit 403 configured to request information associated with availability of timing information of the at least one cell 11, 14 to obtain the indication.

The positioning node 17 may further comprise a generating circuit 404 configured to generate, when determined that the timing information of the at least one cell 11, 14 is available at the user equipment 10, positioning assistance data. The positioning assistance data may comprise information associated with the at least one cell 11, 14. The generating circuit 404 may further be configured to generate positioning assistance data that comprises an indication of a reference cell and a list of neighbour cells. The at least one cell 11, 14 with the available timing information may be at a pre-defined position in the list of neighbour cells and timing information of the reference cell is not known or the reference cell is not a cell serving the user equipment 10 and not a primary cell if the user equipment 10 is configured with carrier aggregation.

Additionally, the positioning node 17 may comprise a transmitting circuit 405 configured to transmit a message to the user equipment 10. The message comprises the positioning assistance data. The positioning assistance data and the timing information of the at least one cell 11, 14 at the user equipment 10 enables positioning of the user equipment 10.

The generating circuit 404 may be configured to generate positioning assistance data that comprises an indication of a reference cell and a list of neighbour cells and information regarding muting sequence of at least some of the cells. The at least one cell 11, 14 with the available timing information is comprised only in the list of neighbour cells in the positioning assistance data. The generating circuit 404 may further be configured to add information regarding muting sequence of another neighbour cell in the positioning assistance data, where the muting sequence is defined with respect to or relative to the information of the at least one cell 11, 14. For example, muting sequence of the another cell e.g. third cell 16 is defined related to SFN=0 of the at least one cell, where SFN=0 of the at least one cell is the information of the at least one cell but muting is define for the another cell. Since the timing information of the at least one cell 11, 14 has to be known to the user equipment 10, the user equipment 10 knows where SFN=0 is.

The generated positioning assistance data may at least in some embodiments be an Observed Time Difference of Arrival assistance data.

The embodiments herein for enabling positioning of the user equipment 10 in the radio communications network may be implemented through one or more processors, such as a processing circuit 407 in the positioning node 17 depicted in FIG. 4, together with computer program code for performing the functions and/or method steps of the embodiments herein. The program code mentioned above may also be provided as a computer program product, for instance in the form of a data carrier carrying computer program code for performing embodiments herein when being loaded into the positioning node 17. One such carrier may be in the form of a CD ROM disc. It is however feasible with other data carriers such as a memory stick. The computer program code may furthermore be provided as pure program code on a server and downloaded to the positioning node 17.

The positioning node 17 may further comprise a memory 408. The memory 408 may comprise one or more memory units and may be used to store for example data such as positioning assistance data, muting sequence, indications of availability of timing information, Cell identities of cells with timing information available and not available, application to perform the methods herein when being executed on the positioning node 17 or similar.

Figure 5:
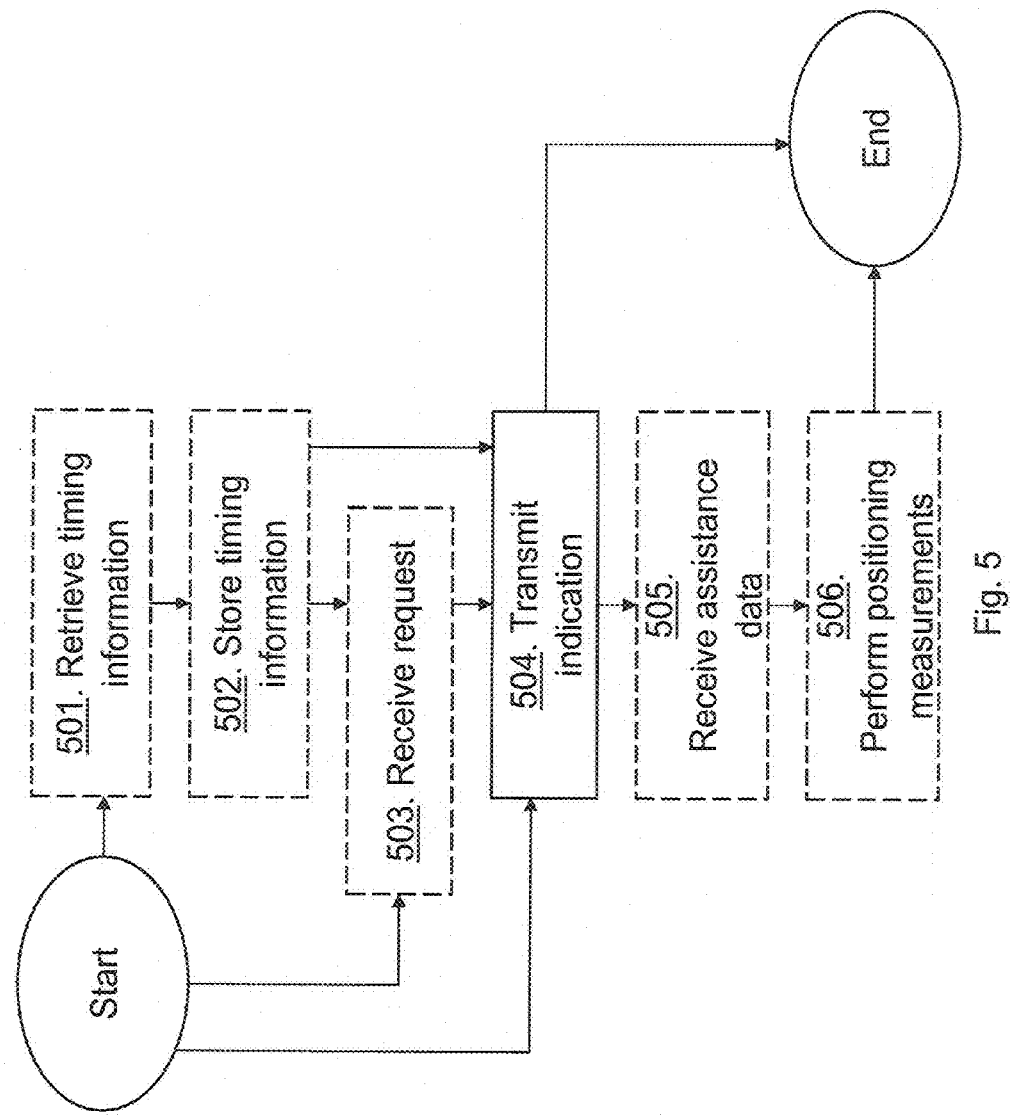
FIG. 5 is a schematic flowchart of a method in a user equipment.

The method steps in the user equipment 10 for enabling positioning of the user equipment 10 according to some general embodiments will now be described with reference to a flowchart depicted in FIG. 5. The user equipment 10 may be served in a first cell 11 controlled by a radio network node, such as the first radio base station 12. A positioning node 17 and the user equipment 10 are comprised in the radio communications network. The steps do not have to be taken in the order stated below, but may be taken in any suitable order. The steps that are performed in some embodiments are indicated with dashed boxes in FIG. 5.

Step 501. The user equipment 10 may retrieve the timing information for the at least one cell 11, 14.

Step 502. The user equipment 10 may store the timing information for a time period.

Step 503. The user equipment 10 may receive a request of information associated with availability of the timing information of the at least one cell 11, 14.

Step 504. The user equipment 10 transmits, to the positioning node 17, an indication indicating availability, at the user equipment 10, of timing information of at least one cell 11, 14. The timing information enables positioning of the user equipment 10.

The transmitted indication may comprise information of the at least one cell 11, 14. The information may e.g. indicate the at least one cell 11, 14 as a specific type of cell, a serving cell, a primary cell, and/or a cell with a known or reliable subframe number. The at least one cell 11, 14 may in some embodiments be either a serving cell for user equipment 10 not configured for carrier aggregation or a cell belonging to a set of serving cells for the user equipment 10 in a carrier aggregation system but not necessarily the primary cell for the user equipment 10. The transmitted indication may be comprised in a positioning request or a request for positioning assistance data. When the timing information had e.g. been retrieved and stored at the user equipment 10, the user equipment 10 may transmit an indication indicating that the timing information is available at the user equipment 10.

Step 505. When the timing information of the at least one cell 11, 14 is available at the user equipment 10, the user equipment 10 may receive, from the positioning node 17, a message comprising positioning assistance data. The positioning assistance data comprises information associated with the at least one cell 11, 14 for which the timing information is known or is obtainable by the user equipment 10. The at least one cell 11, 14 being the cell indicated with the available timing information in the transmitted indication.

Step 506. The user equipment 10 may perform a positioning measurement using the positioning assistance data and the available timing information of the at least one cell 11, 14 to enable positioning of the user equipment 10.

In some embodiments, the received positioning assistance data may comprise an indication of a reference cell and a list of neighbour cells. The at least one cell 11, 14 with the available timing information may be indicated by being at a pre-defined position in the list of neighbour cells. In these embodiment the timing information of the reference cell is not known or the reference cell is not a cell serving the user equipment 10 and not a primary cell for the user equipment 10 if it is configured with carrier aggregation.

In some embodiments the user equipment 10 performs the positioning measurements by determining a timing of a muting sequence of another cell, being different than the at least one cell 11, 14, based on the timing information and information regarding the at least one cell 11, 14 in the received positioning assistance data.

In some embodiments, the methods in the positioning node 17 may be mandated by the pre-defined UE behaviour. In some embodiments this behaviour may be pre-defined for a specific feature, e.g., muting clarifying the prs-MutingInfo element in the LPP.

For example, the UE behaviour may define that

The first bit of the PRS muting sequence corresponds to the first PRS positioning occasion that starts after the beginning of the reference cell SFN=0 if it is known. Otherwise the SFN=0 of the other cell in the neighbour cell list for which SFN is known, where the other cell may be at a pre-defined place, e.g. in the first place, in the list of cells in the positioning assistance data or may be indicated by other means, e.g. by a flag, in the positioning assistance data so that e.g. muting may be defined with respected to the indicated cell, which is not necessarily the reference cell, in the positioning assistance data.

or

The first bit of the PRS muting sequence corresponds to the first PRS positioning occasion that starts after the beginning of the reference cell SFN=0 if it is known, otherwise the SFN=0 of the cell at a pre-defined place in the neighbour cell list.

A benefit with this is that the user equipment 10 knows when the cell is muted and therefore more reliable results of the positioning may be obtained.

In another example, such a behaviour may be not related to a specific feature such as PRS muting, but defined in relation to the positioning assistance data, e.g., in Section 6.5.1.1 of 3GPP TS 36.355 OTDOA Assistance data, where it may be clarified that the user equipment 10 may assume that the reference cell is the cell for which the timing information is known.

In some embodiments, the user equipment 10 signaling the indication to the positioning node 17 stores the timing information for a certain period, e.g., pre-defined or determined by the maximum length of the positioning sessions, for the cells(s) for which it has indicated that it has the timing information for. A benefit to store the timing information is that timing information is available in case the user equipment 10 performs a number of handovers in a limited period of time.

Embodiments herein, in particular signaling or autonomous identification and usage of the indication of the timing information awareness, may be applied in any network and network nodes that rely on the availability of the timing information of at least some cells, which, without signaling or autonomous identification, would not be able to provide reliable positioning service.

Figure 6:
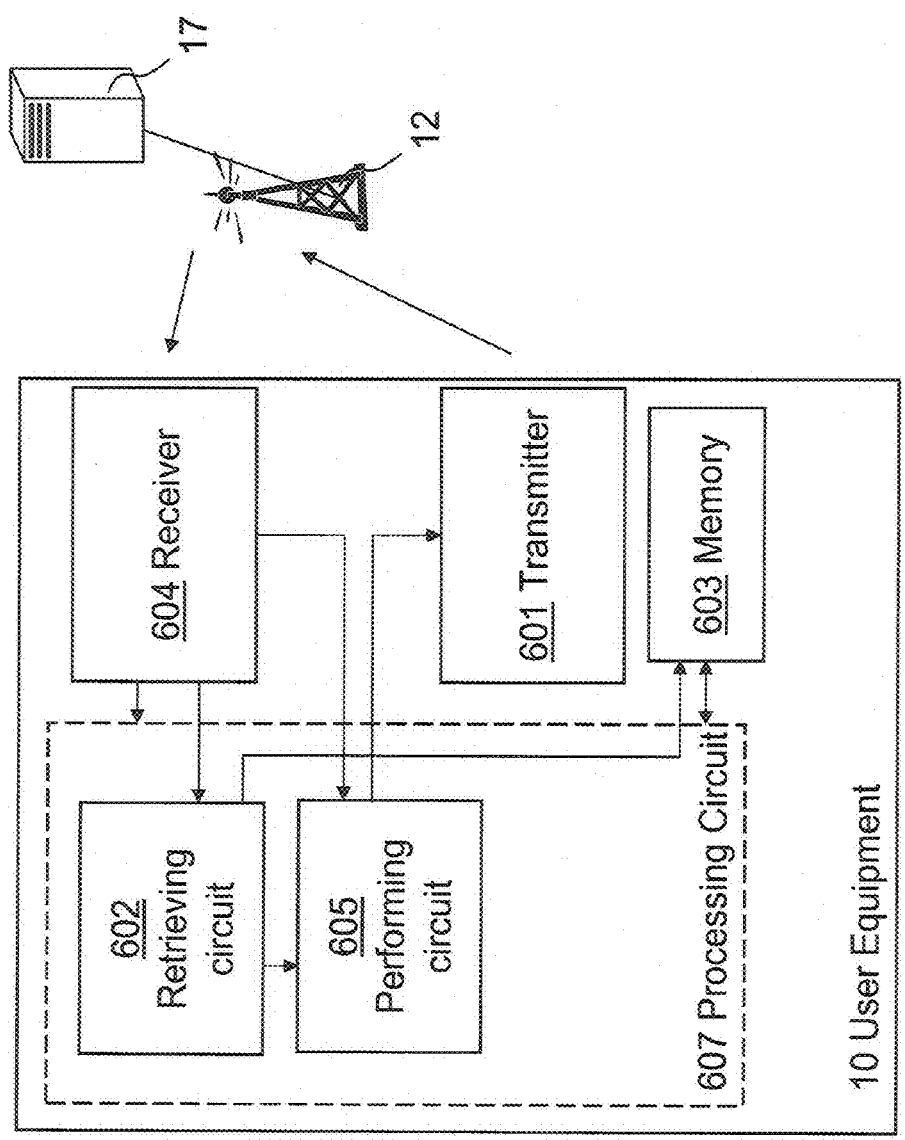
FIG. 6 is a block diagram depicting a user equipment.

FIG. 6 is as block diagram depicting the user equipment 10 for enabling positioning of the user equipment 10. The user equipment 10 is configured to be served in a first cell 11 controlled by a radio network node 12.

The user equipment 10 comprises a transmitter 601 configured to transmit, to a positioning node 17 in the radio communications network, an indication indicating availability, at the user equipment 10, of timing information of at least one cell 11, 14. The timing information is enabling positioning of the user equipment 10. The transmitted indication comprises information of the at least one cell 11, 14, which information indicates the at least one cell 11, 14 as a specific type of cell, a serving cell, a primary cell, and/or a cell with a known or reliable subframe number. The at least one cell 11, 14 may in some embodiments be either a serving cell for user equipment 10 not configured for carrier aggregation or a cell belonging to a set of serving cells for the user equipment 10 in a carrier aggregation system but not necessarily the primary cell for the user equipment 10. The transmitter 601 may further be configured to comprise the indication in a positioning request or a request for positioning assistance data.

The user equipment 10 may further comprise a retrieving circuit 602 configured to retrieve the timing information for the at least one cell 11, 14.

The user equipment may further comprise a memory 603 configured to be used to store the timing information on for a certain time period. The transmitted indication may thus indicate that the timing information is available at the user equipment 10.

The user equipment 10 may additionally comprise a receiver 604 configured to receive a request of information associated with availability of the timing information of the at least one cell 11, 14. The receiver 604 may alternatively or additionally be configured to receive, when the timing information of the at least one cell 11, 14 is available at the user equipment 10, from the positioning node 17, a message. The message comprises positioning assistance data, which positioning assistance data comprises information associated with the at least one cell 11, 14 for which the timing information is known or is obtainable by the user equipment 10. The at least one cell 11, 14 is the cell indicated with the available timing information in the transmitted indication. The received positioning assistance data may comprise an indication of a reference cell and a list of neighbour cells. The at least one cell 11, 14 with the available timing information may be indicated by being at a pre-defined position in the list of neighbour cells or indicated by other means in the assistance data. The timing information of the reference cell may not be known or the reference cell may not be a cell serving the user equipment 10 and not a primary cell for the user equipment 10 if it is configured with carrier aggregation.

The user equipment 10 may further comprise a performing circuit 605 configured to perform a positioning measurement using the positioning assistance data and the available timing information of the at least one cell 11, 14 to enable positioning of the user equipment 10. The performing circuit 605 may further be configured to determine a timing of a muting sequence of another cell, being different than the at least one cell 11, 14, based on the timing information and information regarding the at least one cell 11, 14 in the received positioning assistance data The embodiments herein for enabling positioning of the user equipment 10 in the radio communications network may be implemented through one or more processors, such as a processing circuit 607 in the user equipment 10 depicted in FIG. 6, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The memory 603 may comprise one or more memory units and may be used to store for example data such as positioning assistance data, muting sequence, indications of availability of timing information, positioning measurements, timing information of cells, Cell identities of cells with timing information available and not available, application to perform the methods herein when being executed on the user equipment 10 or similar.

Thus, the following technical advantages are seen with embodiments herein: There is no need for acquiring of the timing information by performing cell detection and reading the broadcast information prior positioning measurements for the reference cell when there is another cell in the assistance data for which the timing information is known to the UE; the positioning accuracy is improved; and the ambiguity with the muting information element currently requiring the knowledge of the timing information of the reference cell in the LPP protocol is resolved. Some embodiments herein do not require the muting sequence to be specified only with respect to the reference cell which in the prior art requires reading the system information of the reference cell if its timing information is not known.

The embodiments are not limited to the currently standardized positioning measurements and methods. The positioning assistance data used in the description shall be understood in a broader sense as the data transmitted by the positioning node 17 to the user equipment 10 in order to assist the user equipment 10 in positioning measurements. Embodiments herein apply both to carrier aggregation and non-carrier aggregation based systems. The positioning assistance data may comprise a list of two cells, e.g. cell identifiers. In one specific example the positioning assistance data is OTDOA assistance data in LTE.

The signaling described herein is either via direct links or logical links, e.g. via higher layer protocols and/or via one or more network nodes. For example, in LTE in the case of signaling between E-SMLC and LCS Client the positioning result may be transferred via multiple nodes at least via MME and Gateway Mobile Location Centre (GMLC).

Embodiments herein are not limited to LTE, but may apply with any Radio Access Network (RAN), single- or multi-RAT. Some other RAT examples are LTE-Advanced, Universal Mobile Telecommunications System (UMTS), GSM, cdma2000, WiMAX, and Wireless Fidelity (WiFi).

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of embodiments herein being defined by the following claims.

The invention claimed is:

1. A method in a positioning node for enabling positioning of a user equipment, which user equipment is served in a first cell controlled by a radio network node, which positioning node and radio network node are comprised in a radio communications network, the method comprising;
   obtaining an indication indicating availability, at the user equipment, of timing information of at least one cell; and
   determining whether the timing information of the at least one cell is available at the user equipment based on the obtained indication, which timing information is enabling positioning of the user equipment;
   generating positioning assistance data, which positioning assistance data comprises information associated with the at least one cell;
   transmitting a message to the user equipment, which message comprises the positioning assistance data, which positioning assistance data and the timing information of the at least one cell available at the user equipment enables positioning of the user equipment;
   wherein the generated positioning assistance data comprises an indication of a reference cell and a list of neighbour cells and information regarding muting sequence of at least some of the cells.

2. The method according to claim 1, wherein the obtaining comprises receiving the indication from the user equipment, the radio network node or a network node.

3. The method according to claim 1, wherein the at least one cell is either a serving cell for user equipment not configured for carrier aggregation or a cell belonging to a set of serving cells for the user equipment in a carrier aggregation system.

4. The method according to claim 1, wherein the obtaining comprises identifying the at least one cell as a specific type of cell based on an identity of the at least one cell and the determining whether the timing information is available is performed by comparing the identity of the at least one cell with an identity, which identity indicates availability of the timing information.

5. The method according to claim 1, further comprising
requesting information associated with availability of timing information of the at least one cell to obtain the indication.

6. The method according to claim 1, wherein the generated positioning assistance data comprises an indication of a reference cell and a list of neighbour cells, where the at least one cell with the available timing information is at a pre-defined position in the list of neighbour cells and timing information of the reference cell is not known or the reference cell is not a cell serving the user equipment and not a primary cell for the user equipment if it is configured with carrier aggregation.

7. The method according to claim 1, where the at least one cell with the available timing information is comprised only in the list of neighbour cells in the positioning assistance data and information regarding muting sequence of another neighbour cell in the positioning assistance data is generated with respect to or relative to the information of the at least one cell.

8. The method according to claim 1, wherein the generated positioning assistance data is Observed Time Difference of Arrival assistance data.

9. The method according to claim 1, wherein the indication indicating the availability, at the user equipment, of timing information of at least one cell is of a type that is subsequently used in combination with other data to determine the positioning of the user equipment.

10. The method according to claim 1, wherein the indication indicating the availability, at the user equipment, of timing information of at least one cell comprises at least one of the following: (a) cell identification of a cell for which a sequence frame number (SFN) is known or reliable; (b) an indication of whether the cell is a serving cell for which timing information is known; (c) an indication of whether a serving cell is a femto cell; (d) an indication of a cell being a particular type of cell.

11. The method in a user equipment for enabling positioning of the user equipment, which user equipment and a positioning node are comprised in a radio communications network, the method comprising;
    transmitting, to the positioning node, an indication indicating availability, at the user equipment, of timing information of at least one cell, which timing information is enabling positioning of the user equipment;
    receiving, from the positioning node, a message comprising positioning assistance data, which positioning assistance data comprises information associated with the at least one cell for which the timing information is known or is obtainable by the user equipment, which at least one cell is the cell indicated with the available timing information in the transmitted indication;
    performing a positioning measurement using the positioning assistance data and the available timing information of the at least one cell to enable positioning of the user equipment; and
    wherein the performing the positioning measurement comprises determining a timing of a muting sequence of another cell, being different than the at least one cell, in the positioning assistance data based on the timing information and information regarding the at least one cell in the received positioning assistance data.

12. The method according to claim 11, wherein the transmitted indication indicates the at least one cell as a specific type of cell, a serving cell, a primary cell, and/or a cell with a known subframe number.

13. The method according to claim 11, wherein the at least one cell is either a serving cell for user equipment not configured for carrier aggregation or a cell belonging to a set of serving cells for the user equipment in a carrier aggregation system.

14. The method according to claim 11, wherein the transmitted indication is comprised in a positioning request or a request for positioning assistance data.

15. The method according to claim 11, further comprising retrieving the timing information for the at least one cell, and
storing the timing information for a certain time period, and wherein the transmitted indication indicates that the timing information is available at the user equipment.

16. The method according to claim 11, further comprising receiving a request of information associated with availability of the timing information of the at least one cell.

17. The method according to claim 11, wherein the received positioning assistance data comprises an indication of a reference cell and a list of neighbour cells, where the at least one cell with the available timing information is indicated by being at a pre-defined position in the list of neighbour cells and timing information of the reference cell is not known, or the reference cell is not a cell serving the user equipment and not a primary cell for the user equipment if it is configured with carrier aggregation.

18. A positioning node for enabling positioning of a user equipment, which user equipment is served in a first cell controlled by a radio network node, wherein the positioning node comprises;
    an obtaining circuit configured to obtain an indication indicating availability, at the user equipment, of timing information of at least one cell; and
    a determining circuit configured to determine whether the timing information of the at least one cell is available at the user equipment based on the obtained indication, which timing information is enabling positioning of the user equipment;
    a generating circuit configured to generate, when determined that the timing information of the at least one cell is available at the user equipment, positioning assistance data, which positioning assistance data comprises information associated with the at least one cell;
    wherein the generating circuit is configured to generate positioning assistance data that comprises an indication of a reference cell and a list of neighbour cells and information regarding muting sequence of at least some of the cells, and
    a transmitting circuit configured to transmit a message to the user equipment, which message comprises the positioning assistance data, which positioning assistance data and the timing information of the at least one cell at the user equipment enables positioning of the user equipment.

19. The positioning node according to claim 18, wherein the obtaining circuit is configured to receive the indication from the user equipment, the radio network node or a network node.

20. The positioning node according to claim 18, wherein the at least one cell is either a serving cell for user equipment not configured for carrier aggregation or a cell belonging to a set of serving cells for the user equipment in a carrier aggregation system.

21. The positioning node according to claim 18, wherein the obtaining circuit is configured to identify the at least one cell as a specific type of cell based on an identity of the at least one cell and the determining circuit is configured to compare the identity of the at least one cell with an identity, which identity indicates availability of the timing information.

22. The positioning node according to claim 18, further comprising a requesting circuit configured to request information associated with availability of timing information of the at least one cell to obtain the indication.

23. The positioning node according to claim 18, wherein the generating circuit is configured to generate positioning assistance data that comprises an indication of a reference cell and a list of neighbour cells, where the at least one cell with the available timing information is at a pre-defined position in the list of neighbour cells and timing information of the reference cell is not known, or the reference cell is not a cell serving the user equipment and not a primary cell for the user equipment if it is configured with carrier aggregation.

24. The positioning node according to claim 18, wherein the at least one cell with the available timing information is comprised only in the list of neighbour cells in the positioning assistance data, and the generating circuit is further configured to add information regarding muting sequence of another neighbour cell in the positioning assistance data with respect to or relative to the information of the at least one cell.

25. The positioning node according to claim 18, wherein the generated positioning assistance data is Observed Time Difference of Arrival assistance data.

26. A user equipment for enabling positioning of the user equipment, which user equipment is configured to be served in a first cell controlled by a radio network node, the user equipment comprises:
 a transmitter configured to transmit, to a positioning node in the radio communications network, an indication indicating availability, at the user equipment, of timing information of at least one cell, which timing information is enabling positioning of the user equipment;
 a receiver receiving configured to receive, from the positioning node, a message comprising positioning assistance data, which positioning assistance data comprises information associated with the at least one cell for which the timing information is known or is obtainable by the user equipment, which at least one cell is the cell indicated with the available timing information in the transmitted indication, and
 a performing circuit configured to perform a positioning measurement using the positioning assistance data and the available timing information of the at least one cell to enable positioning of the user equipment, and
 wherein the performing circuit is configured to determine a timing of a muting sequence of another cell, being different than the at least one cell, in the positioning assistance data based on the timing information and information regarding the at least one cell in the received positioning assistance data.

27. The user equipment according to claim 26, wherein the transmitted indication comprises information of the at least one cell, which information indicates the at least one cell as a specific type of cell, a serving cell, a primary cell, and/or a cell with a known subframe number.

28. The user equipment according to claim 26, wherein the at least one cell is either a serving cell for user equipment not configured for carrier aggregation or a cell belonging to a set of serving cells for the user equipment in a carrier aggregation system.

29. The user equipment according to claim 26, wherein the transmitter is configured to comprise the indication in a positioning request or a request for positioning assistance data.

30. The user equipment according to claim 26, further comprising a retrieving circuit configured to retrieve the timing information for the at least one cell, and a memory configured to be used to store the timing information on for a certain time period, and wherein the transmitted indication indicates that the timing information is available at the user equipment.

31. The user equipment according to claim 26, further comprising a receiver configured to receive a request of information associated with availability of the timing information of the at least one cell.

32. The user equipment according to claim 26, wherein the received positioning assistance data comprises an indication of a reference cell and a list of neighbour cells, where the at least one cell with the available timing information is indicated by being at a pre-defined position in the list of neighbour cells and timing information of the reference cell is not known or the reference cell is not a cell serving the user equipment and not a primary cell for the user equipment.

33. A method in a positioning node comprising:
 the positioning node obtaining an indication indicating availability, at a user equipment, of timing information of at least one cell;
 in response to obtaining the indication the positioning node generating positioning assistance data comprising information associated with the at least one cell; and
 positioning node transmitting the positioning assistance data to the user equipment to enable the user equipment to perform a positioning measurement using both (a) the indication indicating the availability, at the user equipment, of timing information of the at least one cell and (b) the positioning assistance data;
 wherein the positioning assistance data comprises information regarding a muting sequence of a neighbour cell.

34. The method according to claim 33, wherein the indication indicating the availability, at the user equipment, of timing information of at least one cell comprises at least one of the following: (a) cell identification of a cell for which a sequence frame number (SFN) is known or reliable; (b) an indication of whether the cell is a serving cell for which timing information is known; (c) an indication of whether a serving cell is a femto cell; (d) an indication of a cell being a particular type of cell.

* * * * *